United States Patent [19]

Martin

[11] 4,414,771
[45] Nov. 15, 1983

[54] METHOD AND APPARATUS FOR STORING, DISPENSING AND TYING FISH HOOKS

[76] Inventor: Harley D. Martin, 154 Willow Pl. South, Broomfield, Colo. 80020

[21] Appl. No.: 262,095

[22] Filed: May 11, 1981

[51] Int. Cl.³ .............................................. A01K 97/06
[52] U.S. Cl. .......................................... 43/4; 221/279; 221/309; 43/57.1
[58] Field of Search ................... 43/1, 4, 57.5 R, 57.1; 221/279, 307, 309; 206/315, 63.3; 289/17

[56] References Cited

U.S. PATENT DOCUMENTS

| | | | |
|---|---|---|---|
| 2,682,126 | 6/1954 | Shepherd | 43/1 |
| 2,717,470 | 9/1955 | Holdeman | 206/315 |
| 2,804,716 | 9/1957 | Adkison | 43/57.5 R |
| 3,141,258 | 7/1964 | Mayer | 43/57.5 R |
| 3,278,246 | 10/1966 | Baum | 221/279 |
| 3,402,957 | 9/1968 | Peterson | 289/17 |
| 3,430,379 | 3/1969 | Wolfrum | 43/57.5 R |
| 4,333,614 | 6/1982 | Flax | 242/1 |

Primary Examiner—Nicholas P. Godici
Assistant Examiner—Kurt Rowan
Attorney, Agent, or Firm—O'Rourke & Harris

[57] ABSTRACT

Method and apparatus for storing at least one fish hook in a channel, preferably an arcuate channel positioned around an axis and having a cross section complimentary to the fish hook shape, with the eye portion of the fish hook disposed radially outward from the axis of the channel and with the axis of the opening of the eye disposed parallel to the axis of the channel, and preferably with a plurality of fish hooks being protectively disposed in the channel with spring means urging the fish hooks toward one end of the channel against a resilient containment member confining the fish hooks to the channel at the end thereof adjacent openings in the apparatus of a size approximating that of the fish hook eye and positioned adjacent the fish hook eye at the location at which the fish hook is restrained by the containment member, the openings being divergent on at least one side of the fish hook eye such that a fish hook may be urged by the spring means to the end of the channel, contained there by the containment member, a fish line inserted through the fish hook eye by the guiding function of a divergent opening, wrapped and tied around the eye, and the fish hook then removed from the channel by distending the resilient containment member.

18 Claims, 4 Drawing Figures

METHOD AND APPARATUS FOR STORING, DISPENSING AND TYING FISH HOOKS

BACKGROUND OF THE INVENTION

1. Field of the Invention

The present invention relates generally to methods and apparatus for protectively storing and presenting fish hooks in magazine means, dispensing fish hooks from such magazine means, and facilitating tying the confined fish hook to a fish line prior to dispensing the fish hook from the magazine means, and more particularly pertains to an apparatus and method in which an arcuate channel having a cross section adapted to receive and contain a fish hook is defined, spring means within the channel urging the fish hook toward one end of the channel is provided, a containment surface resiliently closing the end of the channel with the fish hook positioned with the eye portion at the radially outer portion of the arcuate channel adjacent an opening defined through the apparatus and aligned with the fish hook eye is included, the opening being substantially the size of and aligned with the fish hook eye opening and diverging on at least one side thereof in a preferably conical or funnel shaped section such that a fish line may be guided by the diverging section through the eye, tied around the protected fish hook eye, and the fish hook then removed by distending the containment surface means.

2. Description of the Prior Art

Because of the nature and use of fish hooks, storage and rigging of a fish hook presents unique problems. Fish hooks of course are quite sharp and present a hazard in handling when the sharpened portion is exposed, particularly when under unsteady conditions a fish line must be tied to the fish hook. It is not unusual for fishermen to suffer substantial frustration if not puncture wounds while attempting to thread and tie a fish line, often cumbersomely attached to a fish pole, through the small fish hook eye while in a boat or standing in or adjacent a stream and subject to the wind and other elements. Further, fish hooks have a tendency when stored together to become entangled thereby presenting an even greater hazard of piercing the skin during handling.

Not surprisingly, a number of proposals have been put forth for storing, dispensing or tying fish hooks. For instance, U.S. Pat. No. 3,141,258, issued July 21, 1964, discloses a capsule which receives and protects the pointed portion of a fish hook while the eye thereof is exposed to permit safe storage and transport of the fish hook. A related concept is to be found in U.S. Pat. No. 3,142,931, issued Aug. 4, 1964, wherein a device for storing and holding a treble hook with the points thereof protected is disclosed. Other variations on devices to safely store fish hooks are to be found in U.S. Pat. Nos. 2,717,470 and 3,540,143. At best, the above discussed devices permit a hook to be protected at the pointed portion while exposing the eye for manual tying of a line thereto. Still, the difficulty of threading a fish line through the eye of the hook is maintained, though the danger of piercing the skin is substantially avoided.

Another approach to dealing with fish hooks is to be found in U.S. Pat. Nos. 2,682,126, and 3,357,086, both of which disclose holders for facilitating threading of fish line or leader through the eye of a fish hook. In both cases, a single fish hook is inserted into a holder with the eye of the fish hook adjacent a converging funnel-like opening to guide the fish line through the eye of the fish hook. However, after the line or leader is threaded through the fish hook eye, in both instances the hook is removed from the holder to permit conventional manual tying of the knot.

SUMMARY OF THE INVENTION

The present invention, which provides a heretofore unavailable means for storing a plurality of fish hooks, presenting the fish hooks for tying of a knot through the eye of the fish hook prior to dispensing the fish hook and while the fish hook is protected, involves a dispenser body having defined therein an arcuate channel with a cross section adapted to receive a fish hook with the eye of the fish hook positioned at the larger radius of the arcuate channel. Spring means are provided to bear upon one or a plurality of fish hooks disposed in the channel, and urge the fish hooks against a distendible containment member positioned at the end of the channel to thereby normally confine the fish hooks between the containment member and the spring means. An opening is defined in the apparatus body of a size substantially the same as that of the fish hook eye at a position immediately adjacent the fish hook eye on either side thereof, the opening then diverging to at least one funnel like configuration from the position adjacent the fish hook eye to the outer surface of the apparatus. Thus a fish line or leader may be inserted through the fish hook eye by simple insertion through the funnel like approach to the fish hook eye and out the other side of the apparatus. The fish line may then be tied into a fish knot by preferably first twirling the device and completing a conventional knot which is then slipped under the distendible containment member and secured at the fish hook eye. Finally, the containment member may be moved aside to permit removal of the fish hook from the storage apparatus with the line.

Accordingly, an object of the present invention is to provide an new and improved apparatus and method for storing and dispensing fish hooks which facilitate convenient tying of a fish line to a protected fish hook while still stored in the apparatus.

Another object of the present invention is to provide a new and improved method and apparatus for sequentially dispensing individual fish hooks from a compact storage apparatus.

Yet another object of the present invention is to provide a new and improved method and apparatus for storing fish hooks in a manner protecting the fish hooks from entanglement while providing for convenient dispensing of the fish hook after tying the fish hook to a fish line or leader.

These and other objects and advantages of the present invention will become apparent from the following description.

DETAILED DESCRIPTION OF THE INVENTION

Figure 1:
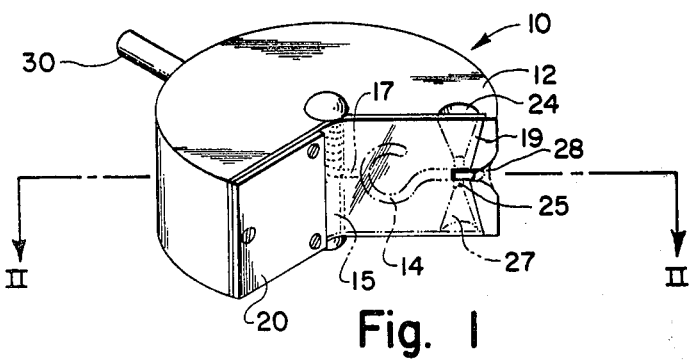
FIG. 1 is a perspective view of a fish hook storing and dispensing apparatus in accord with the instant invention.
Figure 2:
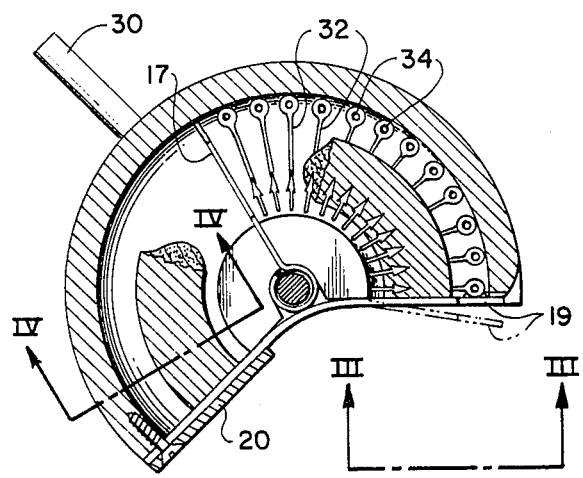
FIG. 2 is a partially cutaway section view alone section line II—II of FIG. 1.

Turning now to the drawings, wherein like components are designated by like reference numerals throughout the various Figures, a fish hook storage and dispensing apparatus in accord with the instant invention is illustrated in FIG. 1 and generally designated by the reference numeral 10. As shown, apparatus 10 includes a body portion 12, illustrated in the form of a partial section of a cylinder, but workable in numerous other configurations, having defined therein an arcuate channel 14 of a cross section complimentary to that of a fish hook. At the center of storage apparatus 10 is a pivot rod 15, carrying spring 17 which extends through slot 18 into channel 14, whereby spring 17 may be, as shown in FIG. 2, positioned to sweep through channel 14. Resilient containment member 19 is positioned at one end of channel 14, secured as illustrated by plate member 20, though containment member 19 may be a single piece unit directly attached to body portion 12.

Figure 3:
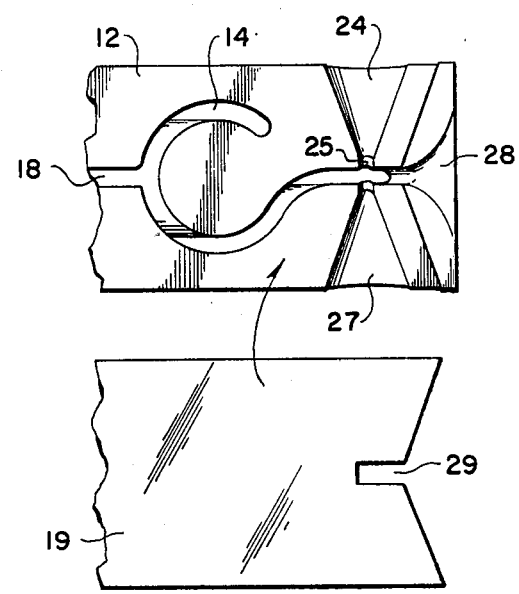
FIG. 3 is an exploded view along line III—III of FIG. 2.

As shown in FIGS. 1, 2 and 3, funnel shaped section 24 is defined in body portion 12 converging towards opening 25 and aligned with adjacent funnel shaped section 27 at the end of channel 14. Groove 28, which cooperates with notch 29 defined in containment member 19, is provided to assist in tying a fish hook to a line as will be described in more detail below. Handle 30 is secured to body portion 12 for convenience in handling and faciliating knot tying.

With reference particularly to FIG. 2, it will be seen that fish hooks 32 may be disposed within channel 14 with the eyes 34 thereof arranged more remote from pivot rod 15. Thus spring 17 can bear upon fish hooks 32 in channel 14 to urge fish hooks 32 towards containment member 19. At containment member 19, eye 34 of fish hook 32 bearing against containment member 19 will be aligned with opening 25. A fish line (not shown) may be readily threaded into funnel shaped section 24, through opening 25 and accordingly through eye 34 of fish hook 32 and out diverging funnel shaped section 27. The end of the fish line may then be moved into groove 28 by slightly displacing containment member 19. Thus a fish line or leader may be threaded through eye 34 of fish hook 32 with the fish line presented in an appropriate manner for completing the tying of the knot while fish hook 32 is maintained in a protected position. Though most any nature of knot may be tied, normally the user would grasp handle 30 and twist body portion 12 to form several twists in the fish line, whereupon a "fisherman's knot" may be readily completed. Then, by pulling on the fish line, containment member 19 may be displaced, as shown in FIG. 2, and fish hook 32 removed from apparatus 10.

Figure 4:
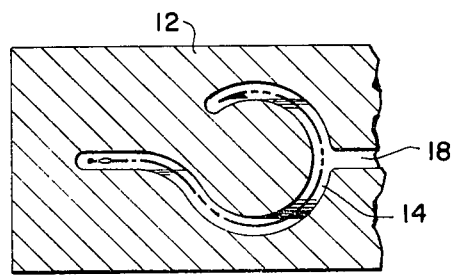
FIG. 4 is a section view along section line IV—IV of FIG. 2.

Certain details of apparatus 10 will be apparent with reference to FIGS. 3 and 4. For instance, as shown in FIG. 3, containment member 19 conveniently includes notch 29 in the end thereof to receive and locate eye 34 and cooperate with groove 28 in body portion 12. Also, containment member 19 may be formed of transparent material thereby enabling a user to conveniently observe the removal of the last of the fish hooks 32. Channel 14, including slot 18 defined to accommodate spring 17, may, in cross-section, be at least in part in the shape of a fish hook with sufficient clearance to allow the fish hook to move through channel 14 while concurrently avoiding substantial movement of fish hook 32 in channel 14 to minimize jamming. Channel 14 may also be defined by surfaces describing less than the entire fish hook cross-section. In embodiments of apparatus 10 in which limited numbers of fish hooks 32 are contained, channel 14 need not be arcuate. However, in the preferred embodiment as illustrated, it will be apparent from, for instance, FIG. 2 that eyes 34 of fish hooks 32 are of a larger dimension thereby causing fish hooks 32 to naturally assume a curved arrangement when urged together. Accordingly, arcuate channel 14 is preferred for compactness in apparatus 10 as well as for the most effective and efficient storage of fish hooks 32.

From the above discussion, it will be apparent that the apparatus of the instant invention provides for not only convenient storage of fish hooks in a protected manner, but also facilitates presentation of the protected hooks in a configuration such that a fish line may be readily guided through the eye of the hook while the hook points are protected, and further a knot may be formed in the fish line after passing through the fish hook eye to conveniently and safely attach the fish hook to the fish line. Though in the preferred embodiment the funnel shaped openings are illustrated as being disposed on either side of the opening adjacent the fish hook eye at the containment member, it is of course apparent that but one funnel shaped opening is required. For convenience, i.e., enabling the fish line to be passed through the funnel shaped opening from either side, two such openings are preferred.

Although only limited embodiments and variations of the instant invention have been illustrated and described in any detail, it is to be understood that those skilled in the art will readily recognize various changes and modifications which changes and modifications are intended to be within the scope of the invention as defined by the following claims.

What is claimed is:

1. Apparatus for storing and dispensing fish hooks, the apparatus comprising:
   a body portion having defined therein a channel of a cross-section adapted to movably hold a fish hook having an eye defined at the end thereof;
   an end surface defined on the body portion in a direction substantially parallel to the cross-sectional plane of the channel and communicating with the channel to define an end opening thereof;
   spring means disposed in the channel and resiliently bearing towards the end surface;
   a resilient containment member attached to the body portion end surface at a position spaced from the channel and adapted for movement toward and away from the channel; and
   a transverse opening defined through the body portion and aligned with the eye portion of a fish hook positioned in the channel and bearing against the resilient containment member;
   whereby the spring means will urge fish hooks positioned in the channel towards the containment member and thereagainst for dispensing by inserting a line through the fish hook eye for removal by distorting the containment member away from the channel end for removal of such hook.

2. Apparatus as set forth in claim 1 in which the body portion is in the form of portion of a cylinder generated around a central axis and the channel is in the form of an arcuate channel extending around the center axis of such cylinder and disposed with the portion of the channel corresponding to the eye portion of a fish hook at the outer radial portion of the channel.

3. Apparatus as set forth in claim 2 in which a pivot rod is positioned at the central axis and the spring means is carried on the pivot rod and extends into the channel.

4. Apparatus as set forth in claim 1 in which the transverse opening in the body portion comprises at least one funnel shaped opening is defined in the body portion and aligned with the remainder of opening extending transversely through the body portion at a position adjacent the end surface adapted to align with a fish hook eye confined between the spring means and the containment member.

5. Apparatus as set forth in claim 4 in which a notch is defined in the containment member at the end portion thereof and adapted to partially receive the eye portion of a fish hook urged against the containment member to position and steady the containment member.

6. Apparatus as set forth in claim 5 in which a groove is defined in the end surface extending from the transverse opening adjacent the fish hook eye portion of the channel and away from the channel to the outer surface of the body portion.

7. Apparatus as set forth in claim 4 in which a pair of opposed funnel shaped openings are defined on adjacent sides of the body portion opening transverse to and aligned therewith at the position occupied by the eye portion of a fish hook.

8. Apparatus as set forth in claim 5 in which a handle portion is attached to the body portion to facilitate turning of the apparatus.

9. Apparatus for guiding and assisting in tying fish line to stored fish hooks, the apparatus comprising:
a body portion in the form of cylinder partially generated around a central axis, the body portion including an arcuate channel defined therein around the central axis and of a cross-section suitable for slidably securing a fish hook within the channel;
an end surface of the body portion defined by a plane extending from the central axis radially outward and communicating with the channel to provide an end opening of the channel at the end surface;
a pivot member disposed at the central axis;
spring means carried on the pivot member and extending into the channel to bear towards the end surface;
a resilient containment member positioned at the end surface to nominally close the channel thereat, the containment member being attached to the body portion at a position adjacent the central axis thereof and extending in a cantilevered manner outwardly therefrom; and
at least one funnel shaped opening defined in the body portion adjacent the end surface at the portion of the channel adapted to receive the eye portion of a fish hook, the funnel opening communicating with a second opening extending through the body portion and opening to the containment member;
whereby fish hooks may be disposed in the channel and maintained against the containment member by the spring means such that a fish line may be guided by the funnel shaped opening through the eye of a fish hook, a knot tied around the eye of the fish hook, and the fish hook and line removed from the channel by resiliently moving the containment member away from the end surface to permit removal of only the tied fish hook from the channel.

10. Apparatus as set forth in claim 9 in which the second opening is also funnel shaped and arranged in a mirror image relationship to the first funnel shaped opening to permit threading of a fish line from either side of the apparatus.

11. Apparatus as set forth in claim 9 in which a notch is defined in the containment member at the end portion thereof and adapted to partially receive the eye portion of a fish hook urged against the containment member to position and steady the fish hook.

12. Apparatus as set forth in claim 11 in which a groove is defined in the end surface extending from the funnel shaped opening adjacent the fish hook eye portion of the channel and radially outward from the channel to the outer surface of the body portion.

13. A method for tying a fish line to a stored fish hook, the method comprising:
positioning at least one fish hook in a channel defined in a body portion and configured to slidably contain the fish hook;
urging the fish hook towards the open end of the channel by spring means;
confining the fish hook at the end of the channel by a resilient containment member bearing against the opening of the end of the channel;
passing a fish line through a funnel shaped opening defined adjacent and into the end of the channel, through the fish hook eye, and out the opposite side of the body portion defining the channel;
moving the containment member only the amount necessary to permit the line to pass between the body portion and the containment member;
tying a knot in the fish line around the eye of the fish hook;
distending the containment member away from the open end of the channel; and
removing the fish hook from the channel.

14. The method for tying a fish line to a stored fish hook as set forth in claim 13 in which the fish hook is stored in an arcuate channel with the eye portion of the fish hook oriented radially outward.

15. The method for tying a fish line to a stored fish hook as set forth in claim 14 in which the body portion is in the form of a cylindrical member having a pie shaped piece removed therefrom, and the arcuate channel is disposed around the axis of the cylinder.

16. The method for tying a fish line to a stored fish hook as set forth in claim 13 in which a second funnel shaped opening is defined opposite the first funnel shaped opening, and the fish line may be passed through the eye of the fish hook from either side of the body portion.

17. The method for tying a fish line to a stored fish hook as set forth in claim 13 in which the knot is tied by twirling the body portion to twist the fish line, and thereafter passing the loose end of the fish line under the twisted portion to form a fisherman's knot.

18. The method for tying a fish line to a stored fish hook as set forth in claim 13 in which a plurality of fish hooks are disposed in the channel with the spring means urging the entire group of fish hooks towards the open end of the channel.

* * * * *